3,140,769
HAY BALE LOADING MACHINE
Charles W. Maxwell, Leith Road, Okato, New Zealand
Filed Oct. 4, 1962, Ser. No. 228,326
Claims priority, application New Zealand Oct. 17, 1961
10 Claims. (Cl. 198—7)

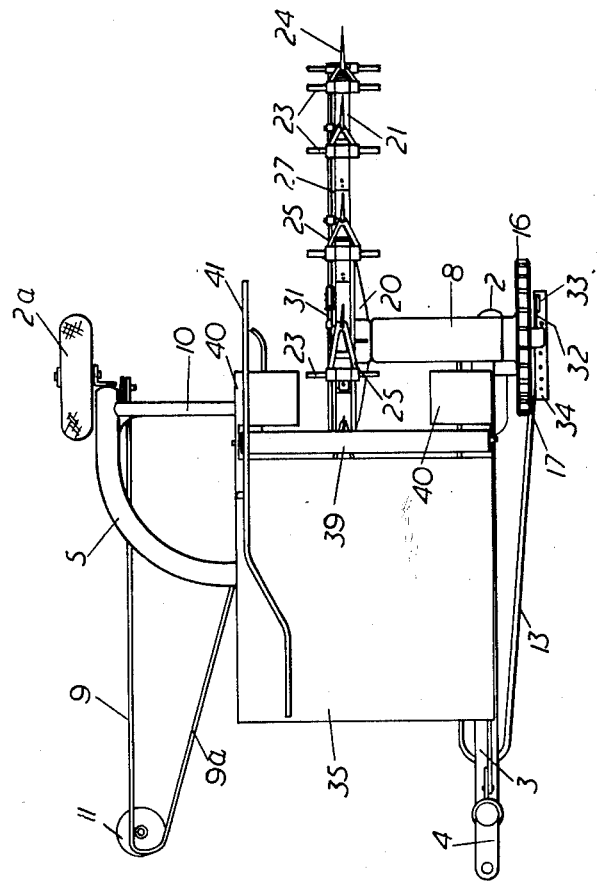

This invention relates to hay bale loading machines and in this specification the term "hay bale" includes bales of hay, straw, grass or the like for example as produced by any of the orthodox hay baling machines known in the farming industry.

It is an object of the present invention to provide a hay bale loading machine which is cheap to manufacture yet is effective in use.

Accordingly, the invention consists in a hay bale loading machine comprising a frame adapted to be moved over the ground on which hay bales to be loaded are lying, power driven movable hook means operatively mounted on said frame and adapted in use to be mechanically inserted into a hay bale lying on the ground, hook lock operating means adapted to cause said hook means to be locked in position in the hay bale and supporting means adapted to support the partly raised hay bale, the construction and arrangement being such that in use on said frame being moved over the ground said hook means will be mechanically inserted into a hay bale lying on the ground will lock therein through operation of said hook lock operating means in a manner such that the hay bale will be raised to a delivery position, with said hook means being automatically unlocked and removed during raising.

In a further aspect in a preferred form, the invention consists in a hay bale loading machine comprising a frame adapted to be moved over ground on which hay bales to be loaded are lying, a plurality of circumferentially mounted radially extendible power driven movable hook means mounted so as to be revolvable in a vertical plane on said frame, power means adapted to drive said hook means, a plurality of hook lock operating means adapted to control the radial extension of said radial extendible hook means and supporting means adapted to support the partially raised hay bale the construction and arrangement being such that in use on said frame being moved over the ground and on said hook means being revolved by said power means said hook means are radially extended to be mechanically inserted into a hay bale lying in position on the ground ready to be engaged and once engaged said hook lock operating means operates so as to lock said hook means in said bale and said bale is then raised by further revolution of said hook means from a position on the ground to a delivery position with said hook means being first unlocked and then removed from said bale during raising when the bale is otherwise supported by said supporting means so that the bale is freed ready for delivery on to the tray of a truck, trailer or like vehicle.

One preferred form of the invention will now be described with reference to the accompanying drawings in which:

FIGURE 2 is a rear view of the hay bale loading machine with part shown in cross section and FIGURE 3 is a plan view.

Figure 1:
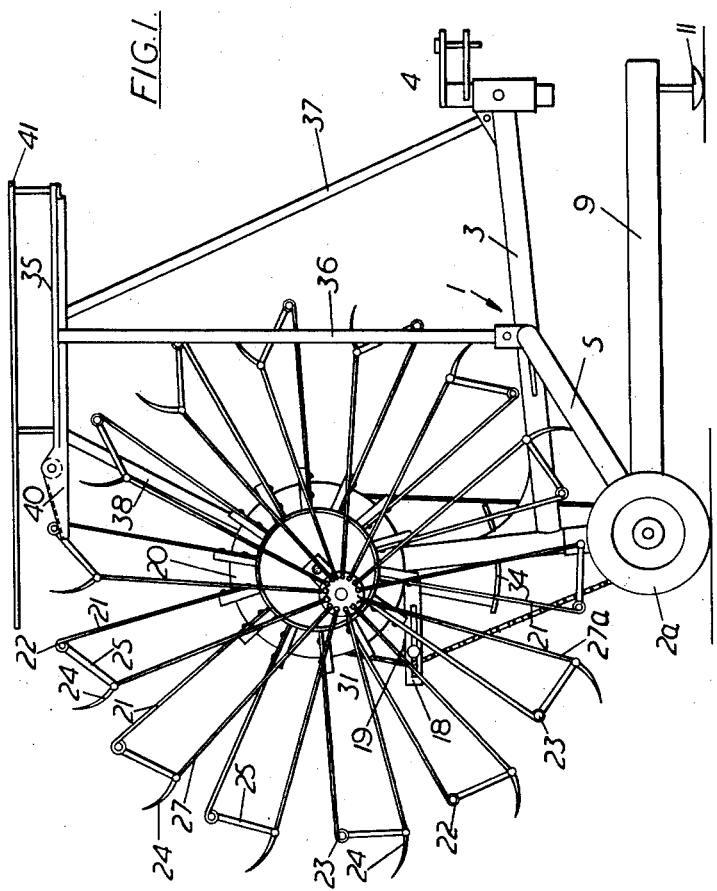
FIGURE 1 is a side elevation of a hay bale loading machine according to the present invention.
Figure 2:
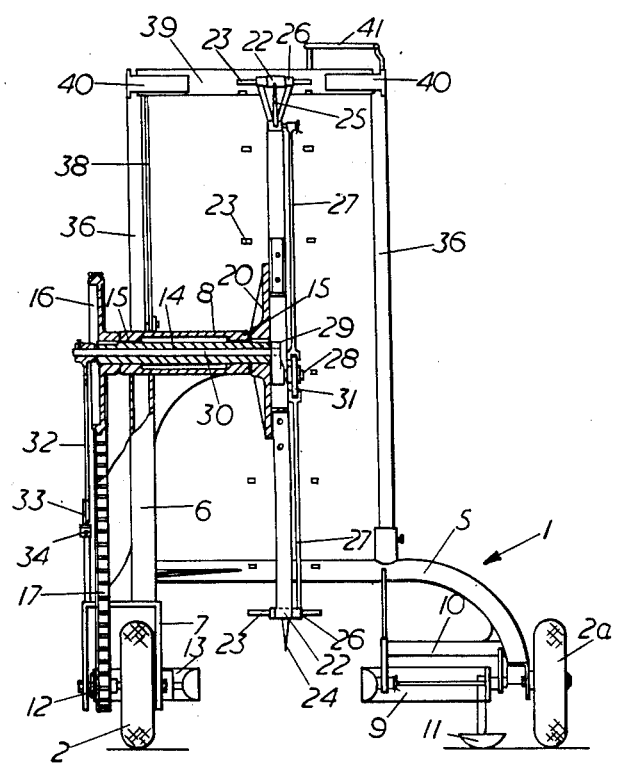

In the preferred form of the invention a hay bale loading machine is constructed having a suitable frame 1 partially supported on ground wheels 2 and 2a adapted to be drawn along by and to one side of a track, trailer or the like vehicle. The frame comprises a longitudinal member 3 inclined inwardly forwardly slightly having an attachment assembly 4 adjacent the forward end thereof to permit the machine to be towed in the normal manner. A transverse member 5 having the outer portion curving downwardly rearwardly extends from substantially intermediate the length of the longitudinal member 3 and provide support for what will be known hereafter as the outer ground engaging wheel 2a. An upright member 6 extends upwardly at right angles to the longitudinal member 3 adjacent the inner ground engaging wheel 2. A yoke 7 attached to the lower end of the member 6 is adapted to mount the inner ground engaging wheel 2. A short cylindrical canter-levered arm 8 extends outwardly from the upper end of the upright 6. This completes the main frame of the machine with each of the members preferably provided from for example suitable mild steel tube or pipe. Gussets are provided to strengthen the frame in the normal manner.

The outer ground engaging wheel 2a is mounted on a stub axle extending through a suitable bracket attached to the end of the transverse member 5. Adjustment apertures are provided in this bracket to allow the wheel to be mounted in varying positions and therefore adjust the height of the frame above the ground.

A bale aligning member 9 is supported adjacent its rear end by brackets extending downwardly from a short cross member 10 attached to the member 5. The side 9a of the aligning member is inclined inwardly to guide the bales to the lifting means as will be further described later. A ground engaging shoe 11 is provided to support the forward end of the aligning member 9. Preferably three adjustment apertures not shown in the accompanying drawings are provided in the supporting barckets extending from the cross member 10 to allow the aligning member to be adjusted in sympathy with the ground engaging wheels.

The inner ground engaging wheel 2 is supported on an axle extending between the arms of the yoke 7. A driving sprocket 12 is also mounted on this axle with a dog-clutch provided to allow the drive to be disengaged when not required. An aligning member 13 is provided in a like manner to that described, in connection with the the aligning member 9 with the rear end of the member 13 supported by brackets extending from the yoke 7. The inner ground engaging wheel 2 and the aligning member 13 are adjustably mounted to allow the height of the frame to be varied in a like manner to that above described in connection with wheel 2a and aligning member 9.

A hollow driving shaft 14 extends through the cantilever arm 8 and is supported on suitable bearing means 15 provided adjacent each end thereof. A driving sprocket 16 is keyed on to the end of the shaft 14 immediately above the sprocket 12 with a driving chain 17 connecting these two sprockets. An arm 18 having a slotted aperture therein to allow movement of a chain tensioning sprocket 19 is provided to adjust the chain. As the height of the frame above the ground may be varied the tensioning sprocket allows for a corresponding adjustment to be provided for the chain drive.

A nave or hub 20 adapted to be revolvable in a substantially vertical plane is keyed to the end of the shaft 14 extending outwardly beyond the outer end of the canter-lever arm 8. A plurality of spokes 21 extend radially from the hub 20 and may be attached thereto in any convenient manner, for example, by attaching channel brackets to the hub and bolting the spokes thereto. The spokes 21 are made from a resilient material such as spring steel strap arranged with the width disposed across the hub, i.e. longitudinally of the shaft so that the end of the spokes may move circumferentially but axial movement is extremely limited if possible at all. The spokes 21 are spaced apart so that at least two and preferably three are provided in a distance around the circumference about their outer ends equivalent to the average length of a hay bale. In the preferred example fourteen such spokes are provided.

The gearing between the sprocket 12 and the sprocket 16 is such that in use when the hay bale machine is moved over the ground the peripheral speed of the outer end of the spokes 21 is at least the same, if preferably slightly greater than the ground speed of the machine for example a speed of about twenty-five to twenty-six r.p.m. at five miles per hour has been found suitable with the hub and spokes rotating in a direction the same as the direction of travel.

The outer end of each of the spokes 21 is formed to provide an eye 22 adapted to have a transverse stabilizing bar 23 passed therethrough and be held in place by a suitable grub screw or like means. The ends of these spokes and associated stabilizing bars 23 provide a supporting means, upon which in use a partially raised bale is supported as will be further described later.

Hook means are provided associated with each of the spokes 21 and comprise a hook or prong 24 for example about four or five inches long curved slightly in length. Each hook 24 is movably associated with the corresponding spoke 21 by a link means 25 trailing the spoke in use. The link 25 comprises an A-shaped member having two collars 26 adapted to pass over the stabilizing bar 23 and be positioned adjacent either side of the eye 22. The side members extend rearwardly inwardly from the collars 26 and join at the point where the hook means is attached to extend upwardly therefrom. The hooks or prongs 24 are curved or shaped for example in an arc with the associated transverse stabilizing bar 23 as centre and it is important that the curve is such as to allow the hooks to engage with and to disengage from the bale cleanly without dragging clearly an arcuate curvature as described allows this. A suitable intermediate brace is provided between the side members to give additional strength to the link 25. Thus as will be seen pivotal movement is possible between the link 25 and the stabilizing bar 23 but no relative movement is possible between the hook 24 and the link 25.

A hook operating means is arranged to insert the hook into a bale to be raised in a way that the hook is pivoted forwardly in the bale, to form an angle of less than forty-five degrees taken from a line normal to the path about which the bale is to be lifted. The actual angle at which the hook is pivoted is governed by the particular shape and size of the component parts described hereafter but must be sufficient to provide a hooking action which will prevent the bale disengaging from the hook. The hook operating means is formed by an eccentric means provided by a crank pin 28 mounted on a crank arm 29 which is positioned adjacent the outer end of the shaft 14. The crank arm 29 is supported on a shaft 30 extending through the hollow center of the shaft 14. An auxiliary hub member 31 is mounted to rotate on the crank pin 28 with one master connecting rod 27a (see FIG. 1) fixed with respect to the auxiliary hub 31 and the remaining connecting rods 27 articulated to the master connecting rod 28 by being pivotally connected to the auxiliary hub 31.

Each of the connecting rods 27 and 27a has the outer end thereof pivotally connected with the short stub axle extending outwardly from the side of the link 25 adjacent the hook 24. The pivotal connection effected between the connecting rods 27 and the auxiliary hub 31 is provided by means of a yoke and suitable pivot pins passing therethrough.

The crank pin 28 supporting the auxiliary hub 31 is adjustable between a range of two hundred and fifteen degrees to two hundred and thirty-five degrees and preferably two hundred and twenty-five degrees measured from the forwardly directed longitudinal line through the center of the main hub. To effect this adjustment a lever manually operated extends from one end of the shaft 30 protruding beyond the inner end of the shaft 14. The lever has a lock means 33 adjacent the lower end thereof adapted to engage within a plurality of apertures along the curved quadrant member 34 which is supported on the frame of the machine. This allows the pivot pin to be easily adjusted between a plurality of predetermined positions.

An off-loading platform 35 is positioned adjacent the top of the lifting wheel above described. The platform is supported by two tubular stands 36 and braces 37 and 38. This assembly is readily detachable so that it may be removed when the machine is stored or during travelling.

A delivery roller 39 is positioned adjacent the forward end of the platform 35 with the top of the roller slightly above a horizontal tangent line drawn through the uppermost position reached by the ends of the spokes 21. Also the roller 39 is positioned slightly forward of the uppermost point reached by the spokes 21. Guiding ramps 40 extending downwardly slightly from adjacent the top of the roller 39 are provided on either side of the spokes 21 to assist in moving the bales raised by the lifting wheel over the roller 39 on to the platform 35.

A further guiding means is provided by a rail 41 positioned adjacent the outer edge of the platform 35. The rail 41 extends forwardly beyond the inclined ramps 40 to assist in guiding the bales as they moved around the outer ends of the spokes 21. The guiding rail 41 is inclined towards the opposite side of the platform 35 for a short distance approximately intermediate of the length of the platform to assist in deflecting the bales towards a person loading them onto a tray of a truck, trailer or the like vehicle.

To use the hay bale loading machine above described the draw bar attachment is connected to a suitable bracket extending from a truck or trailer or like vehicle to position the machine to one side thereof. This bracket is preferably positioned so that the ground wheels 2 and 2a of the machine are in line with the rear wheels of the vehicle. This enables the hay bale loading machine to be more readily maneuverable. The driving sprocket 12 is engaged so that it is rotated by movement of the wheel 2 to drive the hub 20 and spokes 21.

As the machine is moved over the ground bales are guided by the bale aligning members 9 and 13 to a position beneath the hooks 24 for picking up to be raised about the lifting wheel.

As the hub 20 and spokes 21 rotate the movement of the hook 24 supported on the link 25 pivotally connected to trail from the end of each spoke 21 is controlled by the rotation of the auxiliary hub and associated connecting rod 27. With the above described positioning of the crank pin 28 each hook protrudes from within the circumference defined by the outer end of the spokes 21 adjacent the bottom portion thereof and continues to extend to be mechanically inserted into a bale lying on the ground. With the curvature of the hook together with the rotation of the machine the hook is inserted into the bale substantially vertically.

The hook 24 is pivoted about the end of the spoke 21 and because the crank pin 28 is positioned in the rear lower quadrant this pivoting action continues after the hook has been inserted, pivoting the hook in the bale forwardly with respect to the direction of rotation of the hub and to form an angle of less than forty-five degrees from a line normal to the path about which the bale is to be lifted. As the hook passes a line drawn centrally through the main hub and the auxiliary hub the hook commences to be retracted and at the same time it is pivoted about the end of the spoke in the opposite direction. This pivoting action while effecting the desired hooking also increases the circumferential pitch between the teeth. The spacing of the spokes and associated hooks is such that at least two hooks will engage within a bale to be lifted and consequently it is necessary to provide the spokes of resilient material to allow for bending to compensate for the increased circumferential pitch between the teeth. The spacing of the spokes and associated hooks is such that at least two hooks will engage within a bale to be lifted and consequently it is necessary to provide the spokes of resilient material to allow for bending to compensate for the increased circumferential pitch between the hooks. The bending of the spokes thus prevents the hooks from damaging the bale.

The hooks 24 are unhooked and retracted so that when the bale has reached the top of the wheel the hooks have been completely removed and the bale is supported on the end of the spokes 21 ready for delivery on to the delivery platform.

The bale, freed ready for delivery on to the off-loading platform 35, is moved up the inclined ramps 40 over the delivery roller 39, and finally discharged on to the platform from where the bale may be off-loaded on to the tray of a truck, trailer or like vehicle in the known manner.

As was above described it is possible to raise or lower the frame by adjusting the height of the ground wheels 2 and 2a. This allows the machine to be used for bales having various thicknesses although a certain amount of adjustment in this respect is also provided by the movement of the pivot pin 28.

It will be obvious to those skilled in the art that various changes may be made in the invention without departing from the spirit and scope thereof, and therefore the invention is not limited by that which is shown in the drawings, but only as indicated in the appended claims.

What I claim is:

1. A hay bale loading machine comprising a frame adapted to be moved over ground on which hay bales to be loaded are lying, a bale delivery platform adapted to receive bales lifted by the machine, power driven movable hook means operatively mounted on said frame and adapted in use to be hooked into a bale to move it from the ground to said delivery platform, hook operating means adapted in use to mechanically insert said hook means into a hay bale lying on the ground, to lock said hook means in position in said hay bale during lifting and to release said hook means from said bale for delivery, and supporting means movable with said hook means and adapted to support the hay bale being lifted, the construction and arrangement being such that in use on said frame being moved over the ground said hook means will be mechanically inserted into a hay bale lying on the ground and will lock therein in a manner such that the hay bale will be raised to said delivery platform with said hook means being automatically unhooked and removed during raising so that the free bale is released for delivery onto said platform.

2. A hay bale loading machine as claimed in claim 1, wherein said hook operating means is arranged to insert said hook means into said bale, to pivot said hook means forwardly in the bale with respect to the direction of the path about which the bale is to be raised to form an angle of less than forty-five degrees taken from a line normal to the path about which the bale is to be lifted to lock said hook means in said bale and to pivot said hook means rearwardly with respect to the direction of the path about which said bale is to be loaded and at the same time removing said hook means from said bale thereby unhooking and removing the hook means from said bale prior to release onto said delivery platform.

3. A hay bale loading machine as claimed in claim 2, wherein said hook means comprise a plurality of hooks each associated with a resilient spoke, said spokes extending radially from a hub mounted to revolve in a substantially vertical plane and with said spokes spaced apart one from the other at a distance such that in combination the ends of said spokes provide said supporting means enabling a bale of hay to be supported thereon and lifted about part of the circumference of a circle defined upon the rotation of said spokes from the ground to said lifting platform, and a hook link pivotally connected adjacent the end of said spoke and in use adapted to trail therebehind with said hook link supporting a hook in a position directed away from said hub allowing for pivotal movement as said hook is mechanically inserted in and withdrawn from said bale.

4. A hay bale loading machine as claimed in claim 3, wherein said spokes are provided as resilient spokes such as spring steel spokes with a stabling bar provided adjacent the outer end thereof, said stabling bar being adapted in use to coact with at least part of the width of a bale being raised.

5. A hay bale loading machine comprising a frame adapted to be moved over the ground on which hay bales to be loaded are lying, a delivery platform adapted to receive bales lifted by the machine, a rotatable hub, drive means connected to rotate said hub, a plurality of resilient spokes extending radially outwardly from said hub and adapted to rotate in a substantially vertical plane, said spokes being spaced apart one from the other at a distance such that in combination the outer ends of said spokes provide the supporting means to enable a bale of hay or the like material to be supported thereon and lifted about part of the circumference of the circle defined upon rotation of said spokes from the ground to said lifting platform, links pivoted adjacent the end of each said spoke and trailing rearwardly therefrom with respect to the direction of rotation of said hub, a plurality of hooks with each hook supported on its associated link and in a position directed away from said hub, hook operating means adapted to mechanically insert said hooks into a bale lying on the ground to pivot said hook in said bale forwardly with respect to the direction of rotation to said hub to lock said hook in position in said bale during part of the lifting and to pivot said hook in the opposite direction during withdrawal to release said hooks from said bale prior to delivery onto said delivery platform.

6. A hay bale loading machine as claimed in claim 5, wherein said hook operating means comprise eccentric means and connecting rods each said connecting rod having one end controlled by said eccentric means and the other end pivotally associated with the associated hook, said eccentric means being arranged with respect to said hub to control the movement of said connecting rods relative to the movement of said spokes so that during the operative part of one revolution each hook is pivoted about the end of the spoke to extend out from the circumference of the circle defined upon rotation of said spokes adjacent the portion of said circle closest to the ground for said hook to be mechanically engaged in a bale to be lifted and to continue to pivot and extend said hook forwardly to form an angle of less than forty-five degrees with respect to the line normal to the path about which the bale is to be lifted thereby locking said hook in position as said bale is lifted, and to pivot said hook in the opposite direction while retracting said hook to unhook and disengage said hook from said bale prior to said bale being raised to the delivery platform.

7. A hay bale loading machine as claimed in claim 6, wherein said eccentric means comprises an auxiliary hub rotatable about a crank pin with said connecting rods connected to said auxiliary hub with one said connecting rod being a master connecting rod fixed to said auxiliary hub and the other said connecting rod being articulated to said master connecting rod.

8. A hay bale loading machine as claimed in claim 7, wherein the angle of the line giving eccentricity to said auxiliary hub and crank pin is adjustable between two hundred and fifteen degrees and two hundred and thirty-five degrees and preferably about two hundred and twenty-five degrees measured from the forwardly directed longitudinal line through the central point of said main hub in the orthodox manner.

9. A hay bale loading machine as claimed in claim 8, wherein said crank pin supporting said auxiliary hub is manually adjustable as to angle by a lever operable to move over a quadrant with catch means being provided to lock said lever and associated crank pin in a substantially predetermined position.

10. A hay bale loading machine comprising a frame adapted to be moved over the ground on which bales to be loaded are lying, a bale delivery platform supported by said frame in a position to receive bales lifted by the machine, ground wheels supporting said frame, a hub rotatably supported on said frame, a drive connection between ground wheel and said hub, said drive adapted to rotate said hub a plurality of radial resilient spokes extending outwardly from said hub and disposed in a substantially vertical plane, said spokes being spaced apart one from the other at a distance such that in combination the outer ends of said arms will provide a rotatable supporting means enabling a bale of hay straw or the like material to be supported therein and passed about part of the circumference of the circle defined upon rotation of the outer ends of said spokes from the ground to said delivery platform, a link pivotally connected adjacent the end of each said spoke and trailing rearwardly therefrom with respect to the direction of rotation of said hub, a curved hook supported on each said link and directed away from said hub, an auxiliary hub rotatable about a crank pin eccentrically mounted at an angle of between two hundred and fifteen degrees and two hundred and thirty-five degrees and preferably two hundred and twenty-five degrees measured from the forwardly directed longitudinal line through the central point of the main hub, a connecting rod for each hook, each said connecting rod having one end pivotally associated with a hook and the other end associated with said auxiliary hub with one said connecting rod fixed to said auxiliary hub and with the other connecting rods being pivotally connected to said auxiliary hub and thus articulated to said main connecting rod, said auxiliary hub being arranged relative to said main hub to control the movement of said connecting rods so that during the operative part of one revolution each hook is pivoted about the end of the spoke to extend out from the circumfrenece of the circle defined upon rotation of said spokes adjacent the portion of said circle closest to the ground for said hook to be mechanically engaged in a bale to be lifted and to continue to pivot and extend said hook forwardly to form an angle of less than forty-five degrees with respect to the line normal to the path about which the bale is to be lifted thereby locking said hook in position as said bale is lifted, and to pivot said hook in the opposite direction while retracting said hook to unhook and disengage said hook from said bale prior to said bale being raised to the delivery platform.

References Cited in the file of this patent

FOREIGN PATENTS 549,799     Great Britain _____ Dec. 3, 1957